(12) United States Patent
Fan-Chiang et al.

(10) Patent No.: US 11,656,479 B2
(45) Date of Patent: May 23, 2023

(54) DISPLAY APPARATUS

(71) Applicant: Himax Display, Inc., Tainan (TW)

(72) Inventors: Kuan-Hsu Fan-Chiang, Tainan (TW); Chi-Wen Lin, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/856,053

(22) Filed: Apr. 23, 2020

(65) Prior Publication Data
US 2021/0333569 A1 Oct. 28, 2021

(51) Int. Cl.
*G02B 30/33* (2020.01)
*G02F 1/13357* (2006.01)
*H04N 13/32* (2018.01)
*G02F 1/1335* (2006.01)

(52) U.S. Cl.
CPC ....... *G02B 30/33* (2020.01); *G02F 1/133606* (2013.01); *H04N 13/32* (2018.05); *G02F 1/133607* (2021.01)

(58) Field of Classification Search
CPC .. G02B 30/33; H04N 13/32; G02F 1/133606; G02F 2001/133607
USPC .......................................................... 348/51
See application file for complete search history.

(56) References Cited

U.S. PATENT DOCUMENTS

| | | | | |
|---|---|---|---|---|
| 7,327,389 | B2 * | 2/2008 | Horimai | G03B 35/02 348/51 |
| 8,749,622 | B2 * | 6/2014 | Tseng | G09G 3/3233 348/42 |
| 2002/0135673 | A1 * | 9/2002 | Favalora | H04N 13/32 348/42 |
| 2008/0212040 | A1 * | 9/2008 | Aksyuk | G02B 27/48 353/99 |
| 2010/0202725 | A1 * | 8/2010 | Popovich | G03B 21/2033 385/10 |

(Continued)

FOREIGN PATENT DOCUMENTS

EP 2433175 1/2017

OTHER PUBLICATIONS

"Office Action of Taiwan Counterpart Application," dated Jul. 16, 2020, p. 1-p. 4.

*Primary Examiner* — Amir Shahnami
*Assistant Examiner* — Jimmy S Lee
(74) *Attorney, Agent, or Firm* — JCIPRNET

(57) ABSTRACT

A display apparatus includes a coherent light source, a display unit, a light-diffusing element, and at least one optical element. The coherent light source is configured to provide coherent light beams. The display unit is configured to form a three-dimensional image beam based on interference of the coherent light beams, wherein the three-dimensional image beam is imaged on an intermediate imaging surface after passing through the display unit. The light-diffusing element is located on the intermediate imaging surface, wherein a diffusion angle of the three-dimensional image beam is sequentially changed by passing through the light-diffusing element. The at least one optical element is located on a transmission path of the three-dimensional image beam from the light-diffusing element, and is configured to project the three-dimensional image light beam passing through the display unit out of the display apparatus to display a three-dimensional image.

3 Claims, 4 Drawing Sheets

(56) References Cited

U.S. PATENT DOCUMENTS

| | | | | |
|---|---|---|---|---|
| 2013/0050432 | A1* | 2/2013 | Perez | G06F 3/017 |
| | | | | 348/47 |
| 2013/0088568 | A1* | 4/2013 | Nolte | A61B 5/0075 |
| | | | | 348/40 |
| 2013/0169704 | A1* | 7/2013 | Tanaka | G02B 30/27 |
| | | | | 345/691 |
| 2014/0240642 | A1* | 8/2014 | Furukawa | H05B 45/20 |
| | | | | 349/65 |
| 2015/0022746 | A1* | 1/2015 | Ichihashi | G02B 6/0053 |
| | | | | 349/15 |
| 2018/0270474 | A1* | 9/2018 | Liu | A61B 6/508 |
| 2019/0293953 | A1* | 9/2019 | Yoshida | G02B 3/08 |
| 2019/0384153 | A1* | 12/2019 | Huang | G02B 27/0955 |

* cited by examiner

DISPLAY APPARATUS

BACKGROUND

Technical Field

The present invention relates to a display apparatus using the coherent light beams and in particular, to a display apparatus using holography.

Description of Related Art

Three-dimensional (3D) display technologies are applied to various image display fields, for example, movies, televisions (TVs), mobile phones, and the like. A purpose of 3D display, ultimately, is to enable a person to experience a 3D effect as if he or she is in a real environment and accordingly, research is being conducted on a large variety of technologies including, for example, a stereo scheme, a multi-view scheme, and the like. A holography is representatively used as a technology of restoring 3D spatial light information to the form of real light. Holography may restore light in a space, based on interference, that is, a wavelike nature of light.

However, due to the high coherency of the coherent light beams used by a display apparatus using holography, constructive or destructive interference is generated in space as a result, and a spot-shaped speckle is thereby produced on the illuminated surface. Such speckle is an irregular noise-shaped pattern having seemingly irregular bright and dark spots, so the speckle may lead to uneven luminance on the illuminated surface. As such, image quality of the projection apparatus to which such light source is applied is lowered, and users' visual perception is decreased.

A conventional method for eliminating the speckle of a general display apparatus using coherent light beams is to arrange a vibration mirror in front of the coherent light source to homogenize the coherent light beams. However, this method will affect the formation of the hologram because it would change the spatial light information of the coherent light beams, so it cannot be applied to the display apparatus using holography.

SUMMARY

The present invention provides a display apparatus, which can provide an image with high image quality.

The present invention provides a display apparatus. The display apparatus includes a coherent light source, a display unit, a light-diffusing element, and at least one optical element. The coherent light source is configured to provide coherent light beams. The display unit is configured to form a three-dimensional image beam based on interference of the coherent light beams, wherein the three-dimensional image beam is imaged on an intermediate imaging surface after passing through the display unit. The light-diffusing element is located on the intermediate imaging surface, wherein a diffusion angle of the three-dimensional image beam is sequentially changed by passing through the light-diffusing element. The at least one optical element is located on a transmission path of the three-dimensional image beam from the light-diffusing element, and is configured to project the three-dimensional image light beam passing through the display unit out of the display apparatus to display a three-dimensional image.

According to an embodiment of the present invention, the light-diffusing element comprises an actuator, the actuator is electrically connected to the light-diffusing device and is configured to drive the first light-diffusing device at a driving frequency.

According to an embodiment of the present invention, the actuator is configured to drive the light-diffusing element to vibrate, and the driving frequency is a vibrating frequency of the light diffusing element.

According to an embodiment of the present invention, the actuator is configured to drive the light-diffusing element to rotate, and the driving frequency is a rotating frequency of the light diffusing element.

According to an embodiment of the present invention, the light-diffusing element is a liquid crystal element, and the light-diffusing element includes a controller, and the controller controls an arrangement state of liquid crystal molecules of the liquid crystal element to be sequentially changed.

According to an embodiment of the present invention, the controller is capable of controlling the light-diffusing element to form a plurality of diffusing patterns, each of the diffusion patterns is correspondingly formed at a different timing sequence, and the arrangement state of liquid crystal molecules when the light-diffusing element forming one of the diffusing patterns is different from the arrangement state of liquid crystal molecules when the light-diffusing element forming another one of the diffusing patterns.

According to an embodiment of the present invention, the controller is capable of controlling a diffusing-pattern switching frequency of the light-diffusing element, the diffusing-pattern switching frequency is a frequency at which the plurality of diffusion patterns are formed in a unit time, and when the number of types of the plurality of diffusion patterns is N, the range of the diffusing-pattern switching frequency is greater than N times 60 Hz.

In view of the above, by the configuration of the light-diffusing element, the display apparatus according to an embodiment of the disclosure may adjust the uniformity of the entirety of the three-dimensional image beam. Therefore, the three-dimensional image beam formed through the light-diffusing element has a good uniformity, and as a result, the display apparatus may provide a three-dimensional image exhibiting a uniform luminance, so that image quality and a user's visual perception are further improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
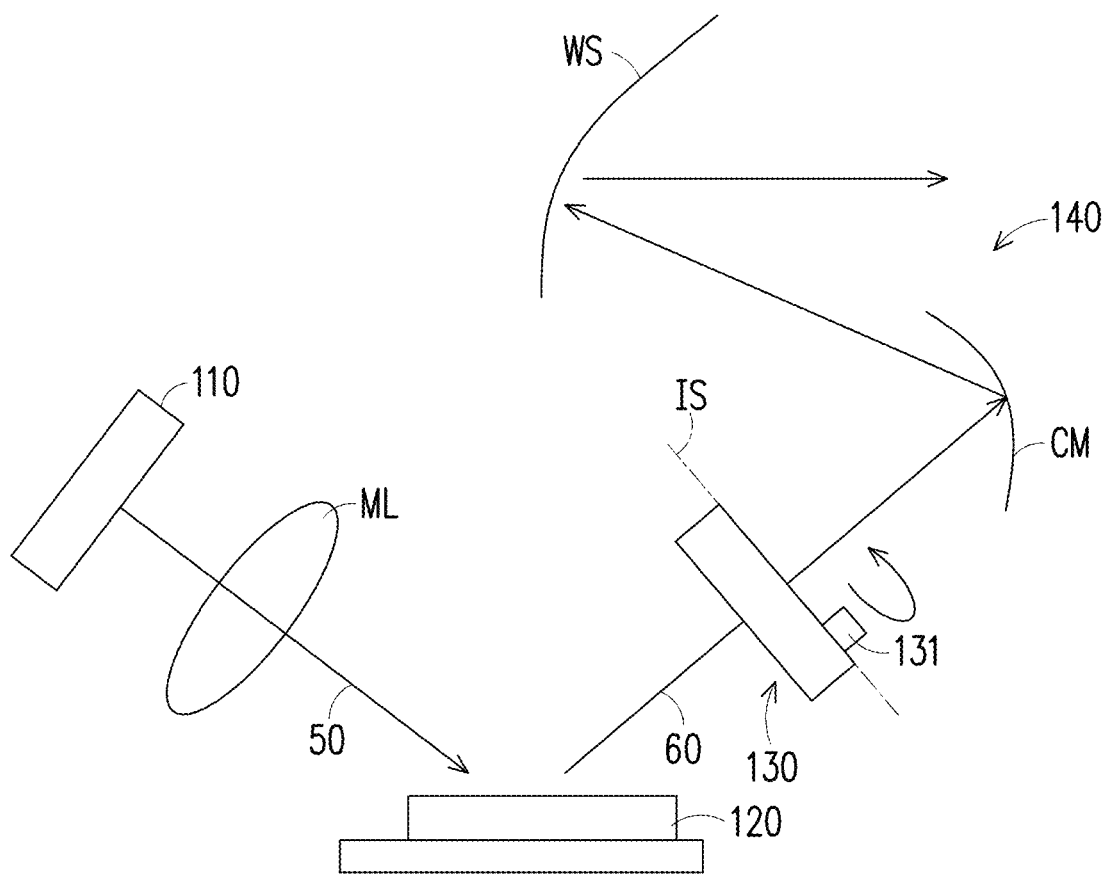
FIG. 1 is a structural schematic diagram of a display apparatus according to one embodiment of the present invention.

FIG. 1 is a structural schematic diagram of a display apparatus according to one embodiment of the present invention. With reference to FIG. 1, in this embodiment, a display apparatus 100 includes a coherent light source 110, a display unit 120, a light-diffusing element 130, and at least one optical element 140. The coherent light source 110 is configured to provide coherent light beams 50. For instance, in the embodiment, the coherent light source 110 is a laser light source and the display unit 120 is a liquid-crystal-on-silicon panel (LCOS panel) enabling modulation of a phase of the coherent light beams 50 so that a three-dimensional image beam 60 can be formed based on interference of the coherent light beams 50 passing through the display unit 120. However, the invention is not limited thereto, in other embodiments, the display unit 120 may also be other types of beam modulators enabling modulation of the phase of the coherent light beams 50 as long as the display unit 120 can be used as a spatial light modulator and may have a structure capable of modulating the phase of the coherent light beams 50.

In addition, as shown in FIG. 1, in the embodiment, the display apparatus 100 may further include a lens ML. Specifically, the lens ML may be disposed so as to correspond to each pixel of the display unit 120 and directs the coherent light beams 50 to specific positions on the display unit 120 so that the coherent beams can be effectively modulated into the three-dimensional image beam 60 which records the spatial light information required to form a three-dimensional image.

In this way, the display unit 120 may be configured to form the three-dimensional image beam 60 based on interference of the coherent light beams 50, and as shown in FIG. 1, the three-dimensional image beam 60 is imaged on an intermediate imaging surface IS after passing through the display unit 120. More specifically, as shown in FIG. 1, in the embodiment, the light-diffusing element 130 is also located on the intermediate imaging surface IS.

Further, as shown in FIG. 1, in the embodiment, the light-diffusing element 130 comprises an actuator 131, the actuator 131 is electrically connected to the light-diffusing device and is configured to drive the first light-diffusing device at a driving frequency. For instance, in this embodiment, the actuator 131 is configured to drive the light-diffusing element 130 to rotate, and the driving frequency is a rotating frequency of the light diffusing element.

In this way, a diffusion angle of the three-dimensional image beam 60 is sequentially changed by passing through the light-diffusing element 130. Further, due to the effect of persistence of vision, the luminance of a speckle on an illuminated surface observed by human eyes is a luminance of speckles superimposed at different time points during the time of persistence of vision. Since the light-diffusing element 130 may enable the speckle distribution of the three-dimensional image beam 60 to be changed over time without affecting its recorded spatial light information, the speckle distributions of the three-dimensional image beam 60 passing through the light-diffusing element 130 at different time points are different, but three-dimensional image beam 60 still may retain its recorded spatial light information. Therefore, after the speckles at different time points during the persistence of vision are superimposed, a light spot exhibiting a uniform luminance is generated, so that the three-dimensional image beam 60 formed through the light-diffusing element 130 has more favorable uniformity and still may retain its recorded spatial light information thereby displaying the formation of three-dimensional image smoothly.

Specifically, since the light-diffusing element 130 is configured to sequentially change the diffusion angle of the three-dimensional image beam 60, the size of the light-diffusing element 130 is preferably slightly larger than the size of the three-dimensional image beam 60 imaged on the intermediate imaging surface IS, so that the light-diffusing element 130 can adjust the uniformity of the entirety of the three-dimensional image beam 60. For instance, in this embodiment, the size of the light-diffusing element 130 is preferably larger than 1 cm.

Further, as shown in FIG. 1, in the embodiment, the at least one optical element 140 is located on a transmission path of the three-dimensional image beam 60 from the light-diffusing element 130, and is configured to project the three-dimensional image light beam passing through the display unit 120 out of the display apparatus 100 to display a three-dimensional image. For instance, in this embodiment, the three-dimensional image light beam passing through the intermediate imaging plane can be transmitted to the at least one optical element 140, and be imaged again by being projected out of the display apparatus 100 through the optical element 140s to display the three-dimensional image. The at least one optical element 140 includes optical elements such as a concave mirror CM and/or a windshield WS. In this way, since the three-dimensional image beam 60 formed through the light-diffusing element 130 has a good uniformity, the display apparatus 100 can provide a three-dimensional image exhibiting a uniform luminance, so that image quality and a user's visual perception are further improved.

Figure 2A:
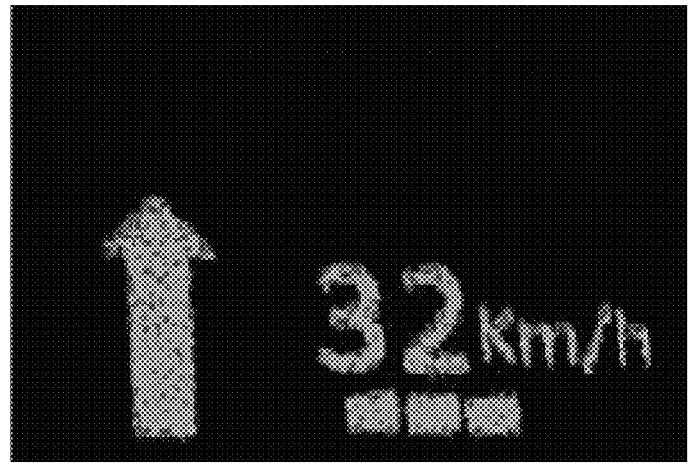
FIG. 2A is a front view of an image provided by a conventional display apparatus according to one comparative example.
Figure 2B:
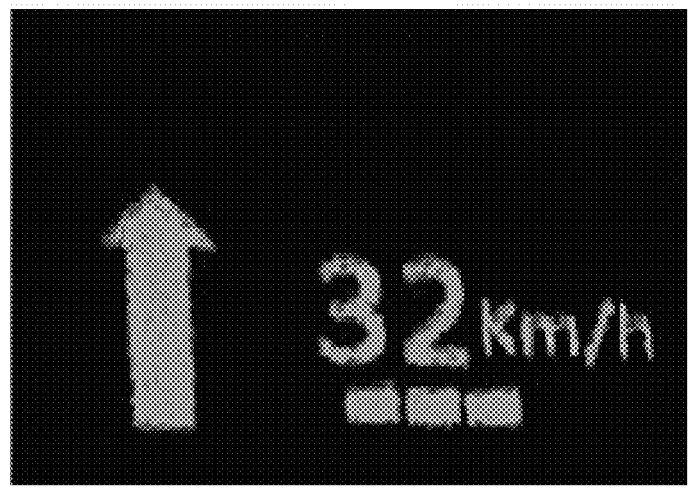
FIG. 2B is a front view of an image provided by the display apparatus of FIG. 1 according to one embodiment of the present invention.

FIG. 2A is a front view of an image provided by a conventional display apparatus 100 according to one comparative example. FIG. 2B is a front view of an image provided by the display apparatus 100 of FIG. 1 according to one embodiment of the present invention. The conventional display apparatus used to display the image of FIG. 2A is similar to the display apparatus 100 of FIG. 1, and the difference therebetween is described as follows. The conventional display apparatus does not have a configuration of the light-diffusing element 130. In this way, as shown in FIG. 2A, the image displayed by the conventional display apparatus has obvious speckles. In contrast, as shown in FIG. 2B, the image of the display apparatus 100 is uniform and clear, thereby having an image quality and improving a user's visual perception.

It should be noted that in the foregoing embodiments, the actuator 131 is exemplified as configured to drive the light-diffusing element 130 to rotate, but the invention is not limited thereto. In another embodiment, the actuator 131 may be configured to drive the light-diffusing element 130 to vibrate, thereby may enabling the speckle distribution of the three-dimensional image beam 60 to be changed over time. More details are described for illustration in the following.

Figure 3:
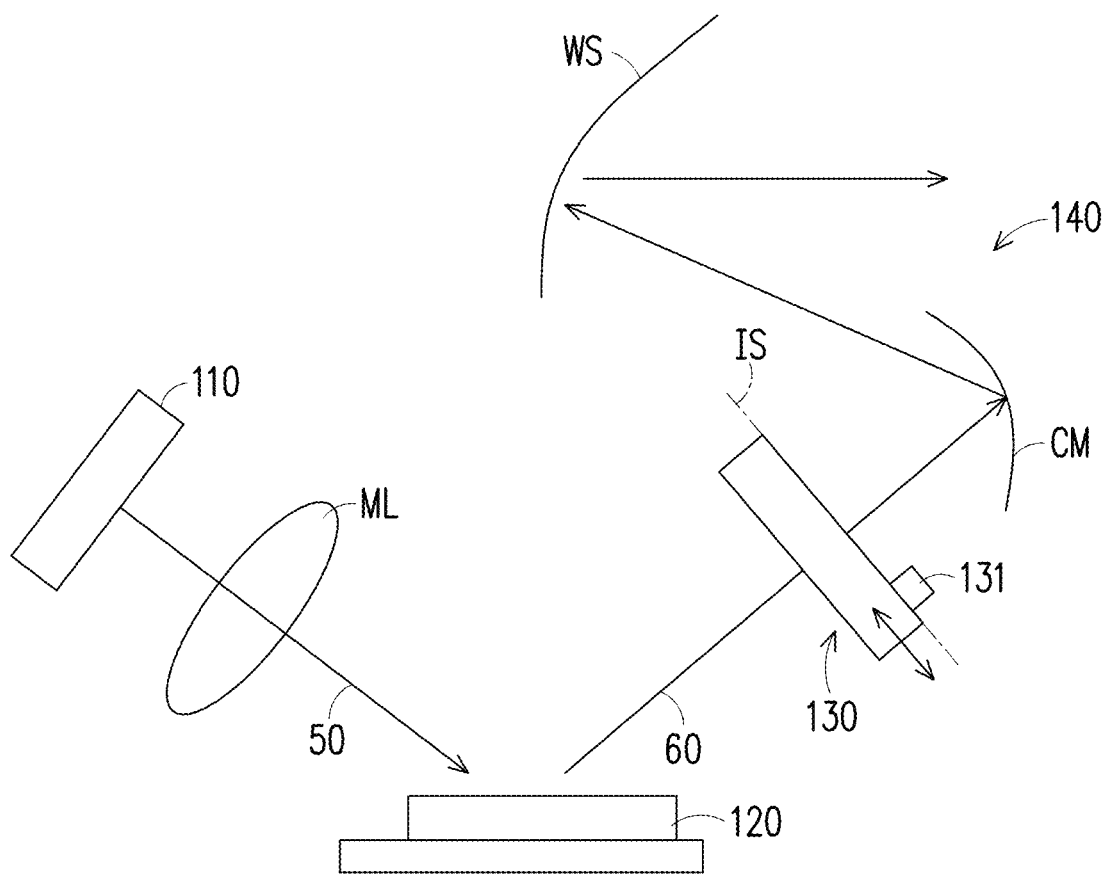
FIG. 3 is a structural schematic diagram of another display apparatus according to one embodiment of the present invention.

FIG. 3 is a structural schematic diagram of another display apparatus according to one embodiment of the present invention. With reference to FIG. 3, a display apparatus 300 of FIG. 3 is similar to the display apparatus 100 of FIG. 1, and a difference therebetween is described as follows. In the present embodiment, the actuator 131 is configured to drive the light-diffusing element 130 to vibrate, and the driving frequency is a vibrating frequency of the light diffusing element. In this way, by the configuration of the light-diffusing element 130, the display apparatus 300 also can adjust the uniformity of the entirety of the three-dimensional image beam 60. Therefore, the display apparatus 300 may also realize functions similar to those of the display apparatus 100, so as to achieve the effects and advantages which are similar to those of the display apparatus 100, and the descriptions thereof are omitted herein.

Furthermore, since the light-diffusing element 130 of the embodiment enables the speckle distribution of the three-dimensional image beam 60 to be changed over time by means of vibrating, a moving range of the light-diffusing element 130 is relatively larger than a moving range of the light-diffusing element 130 by means of rotating. Therefore, the size of the display apparatus 300 can be further reduced.

Figure 4:
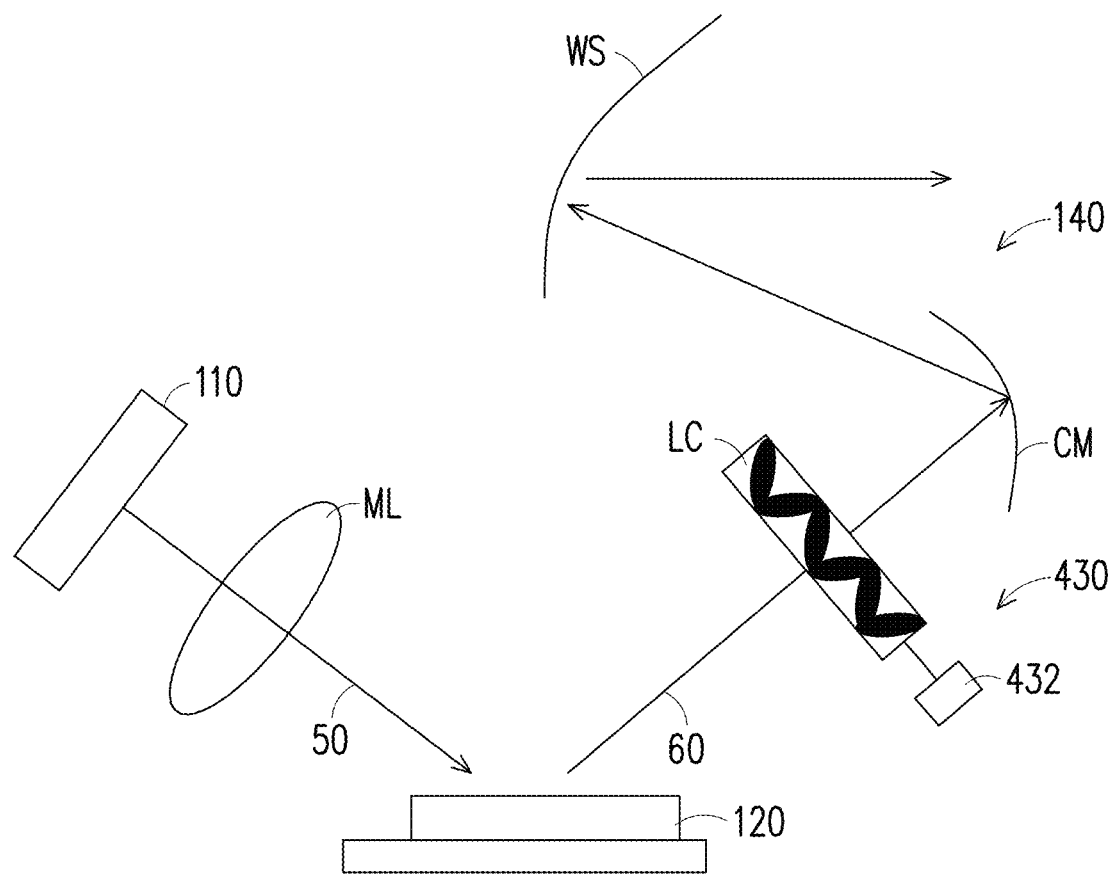
FIG. 4 is a structural schematic diagram of another display apparatus according to one embodiment of the present invention.

FIG. 4 is a structural schematic diagram of another display apparatus according to one embodiment of the present invention. With reference to FIG. 4, a display apparatus 400 of FIG. 4 is similar to the display apparatus 300 of FIG. 3, and a difference therebetween is described as follows. In the present embodiment, the light-diffusing element 430 is a liquid crystal element LC, and the light-diffusing element 430 does not include the actuator 131 but includes a controller 432, and the controller 432 controls an arrangement state of liquid crystal molecules of the liquid crystal element LC to be sequentially changed. For instance, in this embodiment, when the optical axis directions of the liquid crystal molecules of the liquid crystal element LC are substantially chaotic and mutually staggered, the three-dimensional image beam 60 passing through the light-diffusing element 430 will be scattered by the liquid crystal molecules. In other words, when the controller 432 controls the arrangement state of the liquid crystal molecules of the liquid crystal element LC to be a chaotic state, the light-diffusing element 430 can be in an atomized state and can be used to change the diffusion angle of the three-dimensional image beam 60. On the other hand, when the controller 432 controls the optical axis directions of the liquid crystal molecules of the liquid crystal element LC to be substantially the same, the diffusion angle of the three-dimensional image light beam passing through the light-diffusing element 430 would not be changed. In other words, the light diffusing-element at this time can be in a transparent state.

In this way, when the controller 432 controls an arrangement state of liquid crystal molecules of the liquid crystal element LC to be sequentially changed, the diffusion angle of the three-dimensional image beam 60 passing through the light-diffusing element 430 is sequentially changed accordingly. In this way, by the configuration of the light-diffusing element 430, the display apparatus 400 also can adjust the uniformity of the entirety of the three-dimensional image beam 60. Therefore, the display apparatus 400 may also realize functions similar to those of the display apparatus 300, so as to achieve the effects and advantages which are similar to those of the display apparatus 300. More details are described for illustration in the following.

More specifically, in the present embodiment, the controller 432 may also control the arrangement state of the liquid crystal molecules of the light diffusing element to exhibit a specific arrangement state according to the region in which the liquid crystal molecules are located. That is, the controller 432 is capable of controlling the light-diffusing element 430 to form a plurality of diffusing patterns. Moreover, the controller 432 also is capable of controlling each of the diffusion patterns is correspondingly formed at a different timing sequence, and the arrangement state of liquid crystal molecules when the light-diffusing element 430 forming one of the diffusing patterns is different from the arrangement state of liquid crystal molecules when the light-diffusing element 430 forming another one of the diffusing patterns.

More specifically, in the present embodiment, the controller 432 is capable of controlling a diffusing-pattern switching frequency of the light-diffusing element 430, the diffusing-pattern switching frequency is a frequency at which the plurality of diffusion patterns are formed in a unit time, and when the number of types of the plurality of diffusion patterns is N, the range of the diffusing-pattern switching frequency is greater than N times 60 Hz. In this way, the display apparatus 100 also can adjust the uniformity of the entirety of the three-dimensional image beam 60 by controlling the types of the plurality of diffusion patterns of the light-diffusing element 430 and the diffusing-pattern switching frequency of the light-diffusing element 430. Therefore, the display apparatus 400 may also realize functions similar to those of the display apparatus 300, so as to achieve the effects and advantages which are similar to those of the display apparatus 300, and the descriptions thereof are omitted herein.

In light of the foregoing, by the configuration of the light-diffusing element, the display apparatus according to an embodiment of the disclosure may adjust the uniformity of the entirety of the three-dimensional image beam. Therefore, the three-dimensional image beam formed through the light-diffusing element has a good uniformity, and as a result, the display apparatus may provide a three-dimensional image exhibiting a uniform luminance, so that image quality and a user's visual perception are further improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A display apparatus, comprising:
a coherent light source, configured to provide coherent light beams;
a display unit, configured to form a three-dimensional image beam based on interference of the coherent light beams, wherein the three-dimensional image beam is imaged on an intermediate imaging surface after passing through the display unit;
a light-diffusing element, located on the intermediate imaging surface, wherein the light-diffusing element is a liquid crystal element, and the light-diffusing element includes a controller, and the controller controls optical axis directions of liquid crystal molecules of the liquid crystal element are chaotic and mutually staggered to scatter the three-dimensional image beam to control a diffusion angle of the three-dimensional image beam, and the controller controls an arrangement state of liquid crystal molecules with chaotic optical axis directions sequentially changed so as to make the diffusion angle of the three-dimensional image beam sequentially changed by passing through the liquid crystal element so as to make a speckle distribution of the three-dimensional image beam changed over time without affecting a recorded spatial light information of the three-dimensional image beam, wherein the diffusion angle is an angular measure of the increase in beam diameter with distance from the optical aperture from which a light beam emerges; and at least one optical element, located on a transmission path of the three-dimensional image beam from the light-diffusing element, and configured to project the three-dimensional image light beam passing through the display unit out of the display apparatus to display a three-dimensional image.

2. The display apparatus as claimed in claim 1, wherein the controller is capable of controlling the light-diffusing element to form a plurality of diffusing patterns, each of the diffusion patterns is correspondingly formed at a different timing sequence, and the arrangement state of liquid crystal molecules when the light-diffusing element forming one of the diffusing patterns is different from the arrangement state of liquid crystal molecules when the light-diffusing element forming another one of the diffusing patterns.

3. The display apparatus as claimed in claim 1, wherein the controller is capable of controlling a diffusing-pattern switching frequency of the light-diffusing element, the diffusing-pattern switching frequency is a frequency at which the plurality of diffusion patterns are formed in a unit time, and when the number of types of the plurality of diffusion patterns is N, a range of the diffusing-pattern switching frequency is greater than N times 60 Hz.

* * * * *